United States Patent
Kang et al.

(10) Patent No.: US 11,821,061 B2
(45) Date of Patent: Nov. 21, 2023

(54) ANODIZED QUALITY 5XXX ALUMINUM ALLOYS WITH HIGH STRENGTH AND HIGH FORMABILITY AND METHODS OF MAKING THE SAME

(71) Applicant: Novelis Inc., Atlanta, GA (US)

(72) Inventors: Daehoon Kang, Canton, GA (US); YounGoo Hwang, Ulsan (KR)

(73) Assignee: Novelis Inc., Atlanta, GA (US)

( * ) Notice: Subject to any disclaimer, the term of this patent is extended or adjusted under 35 U.S.C. 154(b) by 155 days.

(21) Appl. No.: 15/944,997

(22) Filed: Apr. 4, 2018

(65) Prior Publication Data

US 2018/0291482 A1 Oct. 11, 2018

Related U.S. Application Data

(60) Provisional application No. 62/481,796, filed on Apr. 5, 2017.

(51) Int. Cl.
| | |
|---|---|
| *C22F 1/047* | (2006.01) |
| *C25D 11/04* | (2006.01) |
| *C22C 21/08* | (2006.01) |
| *C22C 3/00* | (2006.01) |
| *B32B 15/01* | (2006.01) |
| *C22C 21/06* | (2006.01) |

(52) U.S. Cl.
CPC .............. *C22C 21/08* (2013.01); *B32B 15/01* (2013.01); *C22C 3/00* (2013.01); *C22C 21/06* (2013.01); *C22F 1/047* (2013.01)

(58) Field of Classification Search
CPC .................................. C22C 21/08; C22F 1/047

USPC ....................................................... 428/472.2
See application file for complete search history.

(56) References Cited

U.S. PATENT DOCUMENTS

| | | | |
|---|---|---|---|
| 3,475,167 A | 10/1969 | Beatty et al. | |
| 4,715,901 A | 12/1987 | Granger | |
| 5,616,190 A * | 4/1997 | Legresy ............. | B22D 11/0622 |
| | | | 148/551 |
| 6,086,690 A | 7/2000 | Wycliffe et al. | |
| 8,524,015 B2 | 9/2013 | Zhao et al. | |
| 10,041,154 B2 | 8/2018 | Hirayama et al. | |

(Continued)

FOREIGN PATENT DOCUMENTS

| | | |
|---|---|---|
| CN | 101072888 | 11/2007 |
| CN | 103131881 | 6/2013 |

(Continued)

OTHER PUBLICATIONS

Machine_English_translation_JP_01312054_A; Hoshino, Kozo, et.al.; Aluminum Alloy for Magnetic Disk and Its Production; Dec. 15, 1989; EPO; whole document (Year: 1989).*

(Continued)

*Primary Examiner* — Tahseen Khan
(74) *Attorney, Agent, or Firm* — Kilpatrick Townsend & Stockton LLP (57) ABSTRACT

Provided herein are anodized quality AA5xxx series aluminum alloys and methods for making the aluminum alloys. Also described herein are products prepared from the anodized quality AA5xxx series aluminum alloy sheets. Such products include consumer electronic parts, consumer electronic product parts, architectural sheet products, architectural sheet product parts, and automobile body parts.

17 Claims, 5 Drawing Sheets

(56) References Cited

U.S. PATENT DOCUMENTS

| | | | |
|---|---|---|---|
| 2006/0024517 A1 | 2/2006 | Doan et al. | |
| 2010/0316887 A1 | 12/2010 | Dwenger | |
| 2013/0126055 A1* | 5/2013 | Sekiya | B21C 1/003 148/439 |
| 2013/0302642 A1 | 11/2013 | Ren | |
| 2014/0044588 A1* | 2/2014 | Asano | C22C 21/00 72/200 |
| 2016/0265090 A1* | 9/2016 | Wen | C21D 8/0236 |
| 2016/0355915 A1* | 12/2016 | Kadali | G06F 1/1626 |
| 2017/0009322 A1* | 1/2017 | Tundal | C22F 1/043 |
| 2017/0022592 A1* | 1/2017 | Gupta | C22C 21/08 |

FOREIGN PATENT DOCUMENTS

| | | |
|---|---|---|
| CN | 103572112 | 2/2014 |
| CN | 104762538 | 7/2015 |
| CN | 105177327 | 12/2015 |
| CN | 105177327 A * | 12/2015 |
| CN | 105177669 | 12/2015 |
| CN | 105543520 | 5/2016 |
| CN | 106011560 | 10/2016 |
| CN | 106350714 | 1/2017 |
| CN | 106544557 | 3/2017 |
| EP | 2489755 | 8/2012 |
| FR | 2707668 | 1/1995 |
| JP | 59157235 | 9/1984 |
| JP | 01189024 | 7/1989 |
| JP | 01189024 A * | 7/1989 |
| JP | 01312054 A * | 12/1989 |
| JP | H01312054 | 12/1989 |
| JP | 02159340 | 6/1990 |
| JP | 03146645 | 6/1991 |
| JP | 08501604 | 2/1996 |
| JP | 09143602 | 6/1997 |
| JP | 09143602 A * | 6/1997 |
| JP | 1121647 | 1/1999 |
| JP | 2001295007 | 10/2001 |
| JP | 2003171727 | 6/2003 |
| JP | 2009209426 | 9/2009 |
| JP | 2011179094 | 9/2011 |
| JP | 2015196867 | 11/2015 |
| JP | 2016056444 | 4/2016 |
| JP | 2017014584 | 1/2017 |
| KR | 20170034443 A | 3/2017 |
| RU | 2230131 | 6/2004 |
| WO | 2016056240 | 4/2016 |

OTHER PUBLICATIONS

Machine_English_translation_CN_105177327_A; He, Jianxian, et.al.; Preparation method for high-magnesium aluminum alloy O-state plate of 5XXX series; Dec. 23, 2015; EPO; whole document (Year: 2015).*
Machine_English_translation_JP_01189024_A; Endo, S.; et. al.; Substrate for Magnetic Recording Medium; Jul. 28, 1989; EPO; whole document (Year: 1989).*
Machine_English_translation_JP_H09143602_A; Hotta, H., et al.; Aluminum Alloy Sheet in Which Anodically Oxidized Film Develops Into Achromatic Light Gray; Jun. 3, 1997; EPO; whole document (Year: 2023).*
International Application No. PCT/US2018/025996, Third Party Observation dated Jul. 19, 2019, 2 pages.
"HunterL, a, b Versus CIE 1976 L*a*b*", HunterLab, Application Notes, Insight on Color vol. 13, No. 2 (2008).
International Application No. PCT/US2018/025996 , "International Search Report and Written Opinion," Jun. 13, 2018, 11 pages.
Russian Application No. 2019131438, "Office Action", dated Mar. 25, 2020, 10 pages.
Australian Application No. 2018249841, "First Examination Report", dated Jul. 10, 2020, 4 pages.
Japanese Application No. 2020-502556, Office Action, dated Nov. 4, 2020, 21 pages.
Chinese Application No. 201880022375.4, Office Action, dated Dec. 2, 2020, 22 pages.
Surong et al., "Ammunition Manufacturing Technology,", Beijing Institute of Technology Press, Available Online at: https://www.amazon.com/Ammunition-manufacturing-technology-weapons-systems/dp/7564087676 Amazon.comwww.amazon.com, 2014, 3 pages.
Canadian Application No. 3,058,480, Office Action, dated Mar. 16, 2021, 5 pages.
Indian Application No. 201917040926, First Examination Report, dated Feb. 27, 2021, 6 pages.
Korean Application No. 10-2019-7031965, Office Action, dated Mar. 16, 2021, 11 pages.
Canadian Application No. 3,058,480 , Notice of Allowance, dated Jan. 13, 2022, 1 page.
Chinese Application No. 201880022375.4 , Office Action, dated Nov. 9, 2021, 20 pages.
Korean Application No. 10-2019-7031965 , Office Action, dated Dec. 20, 2021, 7 pages.
Korean Application No. 10-2022-7002024 , Office Action, dated May 24, 2022, 10 pages.
"Aluminium and Aluminium Alloy Sheets, Strips and Plates", Japanese Standards Association, 1st edition, 2006, pp. 607-611.
Chinese Application No. 201880022375.4, Office Action, dated Jul. 1, 2021, 32 pages.
Japanese Application No. 2020-502556, Office Action, dated Aug. 3, 2021, 19 pages.
Korean Application No. 10-2019-7031965, Office Action, dated Aug. 25, 2021, 7 pages.
"Aluminium Handbook", Eighth Edition, Japan Institute of Aluminium, Ltd., Jan. 15, 2017, pp. 15-19.
Japanese Application No. 2021-196927 , "Office Action", dated Oct. 18, 2022, 11 pages.
Korean Application No. 10-2022-7002024 , "Office Action", dated Nov. 25, 2022, 11 pages.
Australian Application No. 2018249841, Notice of Acceptance dated Dec. 9, 2020, 3 pages.
El-Fakir et al., Numerical Study of the Solution Heat Treatment, Forming, and In-die Quenching (HFQ) Process on AA5754, International Journal of Machine Tools & Manufacture, vol. 87, Dec. 2014, pp. 39-48.
European Application No. 18719399.0, Office Action dated Feb. 17, 2023, 5 pages.
European Application No. 18719399.0, Third Party Observation mailed on Apr. 13, 2021, 3 pages.
Wang et al., Springback Analysis of AA5754 after Hot Stamping: Experiments and FE Modelling, The International Journal of Advanced Manufacturing Technology, vol. 89, Jul. 26, 2016, 14 pages.
Japanese Application No. 2021-196927 , "Office Action", dated Feb. 14, 2023, 16 pages.
Japanese Application No. 2021-196927 , "Office Action", dated May 23, 2023, 13 pages.
Korean Application No. 10-2022-7002024 , "Notice of Decision to Grant", dated Jun. 29, 2023, 3 pages.

* cited by examiner

ANODIZED QUALITY 5XXX ALUMINUM ALLOYS WITH HIGH STRENGTH AND HIGH FORMABILITY AND METHODS OF MAKING THE SAME

CROSS-REFERENCE TO RELATED APPLICATION

The present application claims the benefit of U.S. Provisional Application No. 62/481,796, filed Apr. 5, 2017, the disclosure of which is hereby incorporated by reference in its entirety.

FIELD

The present disclosure relates to aluminum alloy products and more specifically to aluminum alloy sheets exhibiting high strength and formability.

BACKGROUND

Currently used anodized quality 5xxx series aluminum alloys have yield strengths that typically range from 170 MPa to 190 MPa. Products prepared from these alloys are prone to mechanical damage. For example, cellular phones prepared with these alloys are easily scratched, dented, or bent if any external force is applied (e.g., an impact with the floor). Efforts to increase the strength generally result in a deterioration of the anodized quality.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Described herein are anodized quality aluminum alloys having high strength and high formability, along with methods of making the same. Aluminum alloys as described herein comprise 0 to about 0.1 wt. % Si, 0 to about 0.2 wt. % Fe, 0 to about 0.3 wt. % Cu, 0 to about 0.5 wt. % Mn, about 2.0 to about 5.0 wt. % Mg, 0 to about 0.2 wt. % Cr, 0 to about 0.2 wt. % Zn, 0 to about 0.1 wt. % Ti, and up to 0.15 wt. % of impurities, with the remainder as Al. In some cases, the aluminum alloys comprise 0 to about 0.05 wt. % Si, 0 to about 0.1 wt. % Fe, 0 to about 0.1 wt. % Cu, about 0.2 to about 0.5 wt. % Mn, about 2.0 to about 4.5 wt. % Mg, 0 to about 0.1 wt. % Cr, 0 to about 0.1 wt. % Zn, 0 to about 0.05 wt. % Ti, and up to 0.15 wt. % of impurities, with the remainder as Al. In some cases, the aluminum alloys comprise about 0.01 to about 0.05 wt. % Si, about 0.01 to about 0.08 wt. % Fe, about 0.01 to about 0.05 wt. % Cu, about 0.4 to about 0.5 wt. % Mn, about 3.0 to about 4.0 wt. % Mg, about 0.001 to about 0.05 wt. % Cr, about 0.001 to about 0.05 wt. % Zn, about 0.001 to about 0.03 wt. % Ti, and up to 0.15 wt. % of impurities, with the remainder as Al. Optionally, the aluminum alloys are produced by direct chill casting or continuous casting. The aluminum alloys can be processed by homogenization, hot rolling, cold rolling, and/or annealing.

Also described herein are products comprising an aluminum alloy described above. The product can be, for example, a sheet. In some examples, the sheet comprises an anodized sheet. In some cases, one or more surfaces of the anodized sheet comprises a 60° gloss value from 60 to 100. In some cases, one or more surfaces of the anodized sheet comprises an L value from 60 to 90, an a value from −2 to 2, and/or a b value from −2 to 2, each as measured by the Hunter L, a, b color scale. Optionally, one or more surfaces of the sheet comprises a surface roughness value from 0.1 μm to 0.35 μm. Optionally, one or more surfaces of the anodized sheet comprises a surface roughness value from 0.2 μm to 0.8 μm. In some cases, one or more surfaces of the anodized sheet includes no more than one defect per square meter ($m^2$) of the product surface, wherein the defect comprises a razor streak defect or a pickup point defect.

The sheet can have a yield strength of at least about 200 MPa (e.g., from about 200 MPa to about 350 MPa). The sheet can also have a tensile elongation of about 7% or greater. Optionally, the product comprises a consumer electronic part, a consumer electronic product part, an architectural sheet product part, or an automobile body part, among others.

Further described herein are methods of producing an aluminum product. The methods of producing an aluminum product comprise casting an aluminum alloy as described herein to form a cast aluminum alloy, scalping the cast aluminum alloy, homogenizing the cast aluminum alloy, hot rolling the cast aluminum alloy to produce a rolled product, and cold rolling the rolled product. Optionally, the cold rolling step is a two-stage cold rolling step. The two-stage cold rolling step can comprise a first cold rolling step, an intervening annealing step, and a second cold rolling step. Optionally, the method can further comprise annealing the rolled product after the cold rolling step. Aluminum alloy products prepared by the methods described herein are also described.

Further aspects, objects, and advantages will become apparent upon consideration of the detailed description of non-limiting examples that follow.

DETAILED DESCRIPTION

Described herein are anodized quality aluminum alloys and alloy products having high strength and high formability, along with methods for making the same. The alloy products described herein exhibit a yield strength approximately 20% to 30% higher than a product prepared from an aluminum alloy having an equivalent level of anodized quality and formability. The strength is increased by the addition of strengthening elements which enhance strength while maintaining the anodized quality and formability. Achieving the high strength, high formability, and premium anodized quality properties is unexpected, particularly because previous efforts in the industry to increase strength failed because strengthening elements significantly deteriorated the anodized quality. As described herein, the amounts of particular elements are carefully balanced to simultaneously obtain high strength, premium anodized quality, and high formability. The alloys described herein can be used in electronics, transportation, architectural, industrial, automotive, and other applications.

Definitions and Descriptions

The terms "invention," "the invention," "this invention," and "the present invention" used herein are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series" or "5xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," or "the" includes singular and plural references unless the context clearly dictates otherwise.

As used herein, a plate generally has a thickness of greater than about 15 mm. For example, a plate may refer to an aluminum product having a thickness of greater than about 15 mm, greater than about 20 mm, greater than about 25 mm, greater than about 30 mm, greater than about 35 mm, greater than about 40 mm, greater than about 45 mm, greater than about 50 mm, or greater than about 100 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum product having a thickness of less than about 4 mm. For example, a sheet may have a thickness of less than about 4 mm, less than about 3 mm, less than about 2 mm, less than about 1 mm, less than about 0.5 mm, less than about 0.3 mm, or less than about 0.1 mm.

As used herein, the term foil indicates an alloy thickness in a range of up to about 0.2 mm (i.e., 200 microns (μm)). For example, a foil may have a thickness of up to 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm.

Reference is made in this application to alloy temper or condition. For an understanding of the alloy temper descriptions most commonly used, see "American National Standards (ANSI) H35 on Alloy and Temper Designation Systems." An Hxx condition or temper, also referred to herein as an H temper, refers to an aluminum alloy after cold rolling with or without thermal treatment (e.g., annealing). Suitable H tempers include HX1, HX2, HX3 HX4, HX5, HX6, HX7, HX8, or HX9 tempers. For example, the aluminum alloy can be cold rolled only to result in a possible H19 temper. In a further example, the aluminum alloy can be cold rolled and annealed to result in a possible H23 temper.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

As used herein, terms such as "cast metal product," "cast product," "cast aluminum alloy," "cast aluminum alloy product," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10.

The following aluminum alloys are described in terms of their elemental composition in weight percentage (wt. %) based on the total weight of the alloy. In certain examples of each alloy, the remainder is aluminum, with a maximum wt. % of 0.15% for the sum of the impurities.

Alloy Compositions

Described below are novel aluminum-containing 5xxx series alloys. Alloy products prepared from the alloys exhibit high strength, premium anodized quality, and high formability. The properties of the alloy products prepared from the alloys described herein are achieved due to the elemental composition of the alloys and the methods of processing the alloys, as further described below. In particular, Si, Cu, and Fe are carefully controlled and included or excluded in combination with Mg, Mn, and/or other elements as further described below to arrive at the high strength alloys that maintain a premium anodized quality. Such a design is surprising, as the previous understanding in the industry was that premium anodized quality alloys suffer from strength limitations.

In some examples, the alloys can have the following elemental composition as provided in Table 1.

TABLE 1

| Element | Weight Percentage (wt. %) |
| --- | --- |
| Si | 0-0.1 |
| Fe | 0-0.2 |
| Cu | 0-0.3 |
| Mn | 0-0.5 |
| Mg | 2.0-5.0 |
| Cr | 0-0.2 |
| Zn | 0-0.2 |
| Ti | 0-0.1 |
| Others | 0-0.05 (each) |
|  | 0-0.15 (total) |
| Al | Remainder |

In some examples, the alloys can have the following elemental composition as provided in Table 2.

TABLE 2

| Element | Weight Percentage (wt. %) |
| --- | --- |
| Si | 0-0.05 |
| Fe | 0-0.1 |
| Cu | 0-0.1 |
| Mn | 0.2-0.5 |
| Mg | 2.0-4.5 |
| Cr | 0-0.1 |
| Zn | 0-0.1 |
| Ti | 0-0.05 |
| Others | 0-0.05 (each) |
|  | 0-0.15 (total) |
| Al | Remainder |

In some examples, the alloys can have the following elemental composition as provided in Table 3.

TABLE 3

| Element | Weight Percentage (wt. %) |
| --- | --- |
| Si | 0.01-0.05 |
| Fe | 0.01-0.08 |
| Cu | 0.01-0.05 |
| Mn | 0.4-0.5 |
| Mg | 3.0-4.0 |
| Cr | 0.001-0.05 |
| Zn | 0.001-0.05 |
| Ti | 0.001-0.03 |
| Others | 0-0.05 (each) |
|  | 0-0.15 (total) |
| Al | Remainder |

In some examples, the alloys described herein include silicon (Si) in an amount of from 0% to about 0.1% (e.g., from about 0.001% to about 0.10%, from 0% to about 0.05%, from about 0.005% to about 0.05%, from about 0.01% to about 0.05%, or from about 0.01% to about 0.03%) based on the total weight of the alloy. For example, the alloys can include about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, or about 0.10% Si. In some cases, Si is not present in the alloys (i.e., 0%). All expressed in wt. %.

In some examples, the alloys described herein include iron (Fe) in an amount of from 0% to about 0.2% (e.g., from about 0.001% to about 0.2%, from 0% to about 0.1%, from about 0.005% to about 0.1%, from about 0.01% to about 0.08%, or from about 0.01% to about 0.05%) based on the total weight of the alloy. For example, the alloys can include about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, or about 0.20% Fe. In some cases, Fe is not present in the alloys (i.e., 0%). All expressed in wt. %.

In some examples, the alloys described herein include copper (Cu) in an amount of from 0% to about 0.3% (e.g., from about 0.001% to about 0.30%, from about 0.005% to about 0.2%, from 0% to about 0.1%, from about 0.01% to about 0.1%, or from about 0.01% to about 0.05%) based on the total weight of the alloy. For example, the alloys can include about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, or about 0.30% Cu. In some cases, Cu is not present in the alloys (i.e., 0%). All expressed in wt. %.

In some examples, the alloys described herein include manganese (Mn) in an amount of from 0% to about 0.5% (e.g., from about 0.001% to about 0.5%, from about 0.01% to about 0.3%, from about 0.1% to about 0.2%, from about 0.2% to about 0.5%, from about 0.25% to about 0.5%, from about 0.3% to about 0.5%, or from about 0.4% to about 0.5%) based on the total weight of the alloy. For example, the alloys can include about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, about 0.25%, about 0.26%, about 0.27%, about 0.28%, about 0.29%, about 0.30%, about 0.31%, about 0.32%, about 0.33%, about 0.34%, about 0.35%, about 0.36%, about 0.37%, about 0.38%, about 0.39%, about 0.40%, about 0.41%, about 0.42%, about 0.43%, about 0.44%, about 0.45%, about 0.46%, about 0.47%, about 0.48%, about 0.49%, or about 0.50% Mn. In some cases, Mn is not present in the alloys (i.e., 0%). All expressed in wt. %.

In some examples, the alloys described herein include magnesium (Mg) in an amount of from about 2.0% to about 5.0% (e.g., from about 2.5% to about 4.5%, from about 3.0% to about 4.5%, or from about 3.5% to about 4.0%) based on the total weight of the alloy. In some examples, the alloys can include about 2.0%, about 2.1%, about 2.2%, about 2.3%, about 2.4%, about 2.5%, about 2.6%, about 2.7%, about 2.8%, about 2.9%, about 3.0%, about 3.1%, about 3.2%, about 3.3%, about 3.4%, about 3.5%, about 3.6%, about 3.7%, about 3.8%, about 3.9%, about 4.0%, about 4.1%, about 4.2%, about 4.3%, about 4.4%, about 4.5%, about 4.6%, about 4.7%, about 4.8%, about 4.9%, or about 5.0% Mg. All expressed in wt. %.

In some examples, the alloys described herein include chromium (Cr) in an amount of from 0% to about 0.2% (e.g., from about 0.001% to about 0.20%, from 0% to about 0.1%, from about 0.005% to about 0.1%, or from about 0.001% to about 0.05%) based on the total weight of the alloy. For example, the alloys can include about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, or about 0.20% Cr. In some cases, Cr is not present in the alloys (i.e., 0%). All expressed in wt. %.

In some examples, the alloys described herein include zinc (Zn) in an amount of from 0% to about 0.2% (e.g., from about 0.001% to about 0.20%, from 0% to about 0.1%, from about 0.001% to about 0.05%, from about 0.005% to about 0.1%, or from about 0.01% to about 0.05%) based on the total weight of the alloy. For example, the alloys can include about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.10%, about 0.11%, about 0.12%, about 0.13%, about 0.14%, about 0.15%, about 0.16%, about 0.17%, about 0.18%, about 0.19%, or about 0.20% Zn. In some cases, Zn is not present in the alloys (i.e., 0%). All expressed in wt. %.

In some examples, the alloys described herein include titanium (Ti) in an amount of from 0% to about 0.10% (e.g., from about 0.001% to about 0.10%, from 0% to about 0.05%, from about 0.001% to about 0.03%, from about 0.005% to about 0.05%, or from about 0.01% to about 0.03%) based on the total weight of the alloy. For example, the alloys can include about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, or about 0.10% Ti. In some cases, Ti is not present in the alloys (i.e., 0%). All expressed in wt. %.

Optionally, the alloy compositions described herein can further include other minor elements, sometimes referred to as impurities, in amounts of 0.05% or below, 0.04% or below, 0.03% or below, 0.02% or below, or 0.01% or below each. These impurities may include, but are not limited to, V, Zr, Ni, Sn, Ga, Ca, or combinations thereof. Accordingly, V, Zr, Ni, Sn, Ga, or Ca may be present in alloys in amounts of 0.05% or below, 0.04% or below, 0.03% or below, 0.02% or below, or 0.01% or below. In some cases, the sum of all impurities does not exceed 0.15% (e.g., 0.10%). All expressed in wt. %. The remaining percentage of the alloy is aluminum.

In some examples, the alloys described herein have a beta phase composition of $Al(Fe,Mn)_2Si_2$ particles. The average composition of the $Al(Fe,Mn)_2Si_2$ particles can be from about 0.5% to about 0.8% Fe, from about 1.2% to about 1.7% Mn, and from about 2.0% to about 2.7% Si, with the remainder as Al, all based on the weight of an $Al(Fe,Mn)_2Si_2$ particle.

In some cases, the amount of Fe in the $Al(Fe,Mn)_2Si_2$ particle can be from about 0.5% to about 0.75%, from about 0.55% to about 0.70%, or from about 0.60% to about 0.70%. For example, the amount of Fe in the $Al(Fe,Mn)_2Si_2$ particle can be about 0.50%, 0.51%, 0.52%, 0.53%, 0.54%, 0.55%, 0.56%, 0.57%, 0.58%, 0.59%, 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, or 0.80%.

The amount of Mn in the $Al(Fe,Mn)_2Si_2$ particle can be from about 1.3% to about 1.7%, from about 1.4% to about 1.65%, or from about 1.5% to about 1.6%. For example, the amount of Mn in the $Al(Fe,Mn)_2Si_2$ particle can be about 1.3%, 1.31%, 1.32%, 1.33%, 1.34%, 1.35%, 1.36%, 1.37%, 1.38%, 1.39%, 1.40%, 1.41%, 1.42%, 1.43%, 1.44%, 1.45%, 1.46%, 1.47%, 1.48%, 1.49%, 1.50%, 1.51%, 1.52%, 1.53%, 1.54%, 1.55%, 1.56%, 1.57%, 1.58%, 1.59%, 1.60%, 1.61%, 1.62%, 1.63%, 1.64%, 1.65%, 1.66%, 1.67%, 1.68%, 1.69%, or 1.70%.

The amount of Si in the $Al(Fe,Mn)_2Si_2$ particle can be from about 2.1% to about 2.7%, from about 2.2% to about 2.6%, or from about 2.4% to about 2.6%. For example, the amount of Si in the $Al(Fe,Mn)_2Si_2$ particle can be about 2.10%, 2.11%, 2.12%, 2.13%, 2.14%, 2.15%, 2.16%, 2.17%, 2.18%, 2.19%, 2.20%, 2.21%, 2.22%, 2.23%, 2.24%, 2.25%, 2.26%, 2.27%, 2.28%, 2.29%, 2.30%, 2.31%, 2.32%, 2.33%, 2.34%, 2.35%, 2.36%, 2.37%, 2.38%, 2.39%, 2.40%, 2.41%, 2.42%, 2.43%, 2.44%, 2.45%, 2.46%, 2.47%, 2.48%, 2.49%, 2.50%, 2.51%, 2.52%, 2.53%, 2.54%, 2.55%, 2.56%, 2.57%, 2.58%, 2.59%, 2.60%, 2.61%, 2.62%, 2.63%, 2.64%, 2.65%, 2.66%, 2.67%, 2.68%, 2.69%, or 2.70%.

The phase fraction of $Al(Fe,Mn)_2Si_2$ particles in the alloys can range from about 0.2% to about 1% (e.g., from about 0.2% to about 0.8% or from about 0.3% to about 0.6%). For example, the phase fraction of $Al(Fe,Mn)_2Si_2$ particles in the alloys can about 0.2%, 0.3%, 0.4%, 0.5%, 0.6%, 0.7%, 0.8%, 0.9%, or 1.0%.

The average particle size of the $Al(Fe,Mn)_2Si_2$ particles in the alloys can be such that the $Al(Fe,Mn)_2Si_2$ particles occupy a surface area ranging from about 2.0 $\mu m^2$ to about 5.0 $\mu m^2$ (e.g., from about 2.5 $\mu m^2$ to about 4.5 $\mu m^2$ or from about 3.0 $\mu m^2$ to about 4.0 $\mu m^2$). For example, the surface area of the $Al(Fe,Mn)_2Si_2$ particles in the alloys can be about 2.0 $\mu m^2$, 2.1 $\mu m^2$, 2.2 $\mu m^2$, 2.3 $\mu m^2$, 2.4 $\mu m^2$, 2.5 $\mu m^2$, 2.6 $\mu m^2$, 2.7 $\mu m^2$, 2.8 $\mu m^2$, 2.9 $\mu m^2$, 3.0 $\mu m^2$, 3.1 $\mu m^2$, 3.2 $\mu m^2$, 3.3 $\mu m^2$, 3.4 $\mu m^2$, 3.5 $\mu m^2$, 3.6 $\mu m^2$, 3.7 $\mu m^2$, 3.8 $\mu m^2$, 3.9 $\mu m^2$, 4.0 $\mu m^2$, 4.1 $\mu m^2$, 4.2 $\mu m^2$, 4.3 $\mu m^2$, 4.4 $\mu m^2$, 4.5 $\mu m^2$, 4.6 $\mu m^2$, 4.7 $\mu m^2$, 4.8 $\mu m^2$, 4.9 $\mu m^2$, or 5.0 $\mu m^2$.

The $Al(Fe,Mn)_2Si_2$ particles in the alloys can have an average length ranging from about 1.0 $\mu m$ to about 5.0 $\mu m$ (e.g., from about 1.5 $\mu m$ to about 4.0 $\mu m$ or from about 2.0 $\mu m$ to about 3.5 $\mu m$). For example, the average length of the $Al(Fe,Mn)_2Si_2$ particles in the alloys can be about 1.0 $\mu m$, 1.1 $\mu m$, 1.2 $\mu m$, 1.3 $\mu m$, 1.4 $\mu m$, 1.5 $\mu m$, 1.6 $\mu m$, 1.7 $\mu m$, 1.8 $\mu m$, 1.9 $\mu m$, 2.0 $\mu m$, 2.1 $\mu m$, 2.2 $\mu m$, 2.3 $\mu m$, 2.4 $\mu m$, 2.5 $\mu m$, 2.6 $\mu m$, 2.7 $\mu m$, 2.8 $\mu m$, 2.9 $\mu m$, 3.0 $\mu m$, 3.1 $\mu m$, 3.2 $\mu m$, 3.3 $\mu m$, 3.4 $\mu m$, 3.5 $\mu m$, 3.6 $\mu m$, 3.7 $\mu m$, 3.8 $\mu m$, 3.9 $\mu m$, 4.0 $\mu m$, 4.1 $\mu m$, 4.2 $\mu m$, 4.3 $\mu m$, 4.4 $\mu m$, 4.5 $\mu m$, 4.6 $\mu m$, 4.7 $\mu m$, 4.8 $\mu m$, 4.9 $\mu m$, or 5.0 $\mu m$.

The $Al(Fe,Mn)_2Si_2$ particles in the alloys can have, on average, a low aspect ratio (e.g., width to height ratio). In some cases, a low aspect ratio as described herein is a ratio of about 3 or less (e.g., about 2.5 or less or about 2 or less). For example, the average aspect ratio can be about 3.0 or less, about 2.9 or less, about 2.8 or less, about 2.7 or less, about 2.6 or less, about 2.5 or less, about 2.4 or less, about 2.3 or less, about 2.2 or less, about 2.1 or less, about 2.0 or less, about 1.9 or less, about 1.8 or less, or about 1.7 or less. In some examples, the average aspect ratio can be from about 1.0 to about 3.0, from about 1.2 to about 2.8, or from about 1.5 to about 2.5.

Alloy Properties

The products prepared from the aluminum alloys described herein have a combination of desired properties, including high strength, high anodized quality, and high formability. The sheets can be provided under a variety of temper conditions, including Hxx-temper conditions. Under these temper conditions, the aluminum alloy products can exhibit a yield strength of at least about 200 MPa (e.g., from about 200 MPa to about 350 MPa, from about 210 MPa to about 320 MPa or from about 230 MPa to about 280 MPa). In non-limiting examples, the yield strength is at least about 210 MPa, at least about 220 MPa, at least about 230 MPa, at least about 240 MPa, at least about 250 MPa, or at least about 260 MPa. For example, the aluminum alloy products described herein can exhibit a yield strength of about 200 MPa, about 210 MPa, about 220 MPa, about 230 MPa, about 240 MPa, about 250 MPa, about 260 MPa, about 270 MPa, about 280 MPa, about 290 MPa, about 300 MPa, about 310 MPa, about 320 MPa, about 330 MPa, about 340 MPa, or about 350 MPa.

The aluminum alloy products can also exhibit a tensile elongation of about 7% or greater (e.g., from about 7.5% to about 15%, from about 9% to about 14%, or from about 10% to about 13%). In non-limiting examples, the aluminum alloy products described herein can exhibit a tensile elongation of about 7.5% or greater, about 8% or greater, about 8.5% or greater, about 9% or greater, about 9.5% or greater, about 10% or greater, about 10.5% or greater, about 11% or greater, about 11.5% or greater, or about 12% or greater. For example, the aluminum alloy products described herein can exhibit a tensile elongation of about 7%, about 7.5%, about 8%, about 8.5%, about 9%, about 9.5%, about 10%, about 10.5%, about 11%, about 11.5%, about 12%, about 12.5%, about 13%, about 13.5%, about 14%, about 14.5%, or about 15%.

The aluminum alloy products described herein can be anodized to form anodized aluminum alloy products. The anodized aluminum alloy products can exhibit a gloss value measured at 60 degrees to the rolling direction (i.e., 60° gloss value) of from about 60 to about 100. The 60° gloss value indicates the degree of shine of the surface and can be measured by a glossmeter according to ASTM D523. In some cases, the 60° gloss value can be about 60 or greater, about 65 or greater, about 70 or greater, about 75 or greater, about 80 or greater, about 85 or greater, about 90 or greater, or about 95 or greater. For example, the 60° gloss value can be about 60, 65, 70, 75, 80, 85, 90, 95, 96, 97, 98, or 99, 100, or anywhere in between.

The color of one or more surfaces of the product can be quantified by a colorimetric measurement using the "Hunter L, a, b" color scale, as described in "Hunter L, a, b Versus CIE 1976 L*a*b*," Application Notes, Insight on Color Vol. 13, No. 2 (2008). The Hunter L, a, b, color scale is based on the Opponent-Colors Theory, which assumes that receptors in the human eye perceive color as a pair of opposites: light-dark ("L value"), red-green ("a value"), and yellow-blue ("b value").

The L value refers to the lightness or darkness of the product surface. An L value of 100 indicates the lightest color and an L value of 0 indicates the darkest color. In some examples, the aluminum alloy products described herein have an L value from about 60 to about 90, after anodizing the product, as measured by the Hunter L, a, b color scale. For example, one or more surfaces of anodized products including the aluminum alloys described herein can have an L value from about 65 to about 85 or from about 70 to about 80. In some cases, one or more surfaces of the anodized products including the aluminum alloys described herein can have an L value of about 60, 65, 70, 75, 80, 85, or 90, or anywhere in between.

The a value refers to the redness or greenness of the product surface. A positive a value refers to the redness of the product surface, whereas a negative a value refers to the greenness of the product surface. In some examples, the aluminum alloy products described herein have one or more surfaces having an a value from about −2 to about 2, after anodizing the product, as measured by the Hunter L, a, b color scale. For example, one or more surfaces of an anodized product including the aluminum alloys described herein can have an a value of about −2.0, −1.9, −1.8, −1.7, −1.6, −1.5, −1.4, −1.3, −1.2, −1.1, −1.0, −0.9, −0.8, −0.7, −0.6, −0.5, −0.4, −0.3, −0.2, −0.1, 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0, or anywhere in between.

The b value refers to the yellowness or blueness of the product surface. A positive b value refers to the yellowness of the product surface, whereas a negative b value refers to the blueness of the product surface. In some examples, the aluminum alloy products described herein have one or more surfaces having a b value from about −2 to about 5 (e.g., from about −2 to about 2), after anodizing the product, as measured by the Hunter L, a, b color scale. For example, one or more surfaces of an anodized product including the aluminum alloys described herein can have a b value of about −2.0, −1.9, −1.8, −1.7, −1.6, −1.5, −1.4, −1.3, −1.2, −1.1, −1.0, −0.9, −0.8, −0.7, −0.6, −0.5, −0.4, −0.3, −0.2, −0.1, 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0.

Optionally, the as-rolled products described herein (e.g., without any anodization) can have a surface roughness value (2D and 3D) ranging from about 0.1 µm to about 0.35 µm (e.g., 0.10 µm, 0.15 µm, 0.20 µm, 0.25 µm, 0.30 µm, or 0.35 µm, or anywhere in between). In some cases, the products described herein, after anodization, can have a surface roughness value (2D and 3D) ranging from about 0.2 µm to about 0.8 µm (e.g., 0.2 µm, 0.25 µm, 0.3 µm, 0.35 µm, 0.4 µm, 0.45 µm, 0.5 µm, 0.55 µm, 0.6 µm, 0.65 µm, 0.7 µm, 0.75 µm, or 0.80 µm, or anywhere in between).

In some cases, the anodized aluminum alloy products described herein can be free from or contain very few visible defects, such as razor streaks or pickup point defects after anodizing. Razor streaks typically appear as dark or bright lines. Pickup point defects typically appear as dark or bright spots. The anodized aluminum alloy products described herein, however, have minimized constituents and minimized elongated grains, as compared to conventional anodized aluminum alloy products. In addition, the products described herein are processed in a manner to minimize surface oxidation and other contaminations, thus resulting in a smooth rolled surface for the anodized aluminum alloy products. In some examples, one or more surfaces of the anodized aluminum alloy products include no more than one razor streak defect per square meter ($m^2$) of the product surface. In some examples, one or more surfaces of the anodized aluminum alloy products include no more than one pickup point defect per $m^2$ of the product surface.

The aluminum alloy products described herein can have any suitable gauge. The alloys described above can be cast and processed into various sizes and thicknesses, such as foil (e.g., below approximately 0.20 mm), sheet (e.g., from approximately 0.20 mm to 4.0 mm), shate (e.g., from approximately 4.0 mm to 15.0 mm), or plate (e.g., greater than approximately 15.0 mm), although other thicknesses and ranges can be used as well. In some examples, the aluminum alloy products described herein can be provided and delivered to a customer or an end user in an intermediate gauge (e.g., a gauge that will be further reduced by the customer or end user, as desired). In some examples, the aluminum alloy products described herein can be provided and delivered to a customer or an end user in a final gauge (e.g., a gauge that will not be further reduced by the customer or end user).

Methods of Making

In certain aspects, the disclosed alloy composition is a product of a disclosed method. Without intending to limit the disclosure, aluminum alloy product properties are partially determined by the formation of microstructures during the alloy product's preparation. In certain aspects, the method of preparation for a product having a certain alloy composition may influence or even determine whether the resulting alloy product will have properties adequate for a desired application.

Casting and Scalping

The alloys described herein can be cast into ingots using a direct chill (DC) process or can be cast using a continuous casting (CC) process. The casting process is performed according to standards commonly used in the aluminum industry as known to one of skill in the art. The CC process may include, but is not limited to, the use of twin belt casters, twin roll casters, or block casters. In some examples, the casting process is performed by a CC process to form a slab, a strip, or the like. In some examples, the casting process is a DC casting process to form a cast ingot. A molten metal filter (e.g., a ceramic foam filer or a porous tube filter) can optionally be used during the casting process to improve metal cleanliness.

If formed by DC casting, the cast ingot can then be scalped. Optionally, the ingot can be scalped up to 20 mm per side (e.g., 1 mm per side, 2 mm per side, 5 mm per side, 10 mm per side, 15 mm per side, or 20 mm per side). For example, the cast ingot can be scalped from 1 mm to 20 mm per side, from 5 mm to 20 mm per side, from 10 mm to 20 mm per side, or from 15 mm to 20 mm per side.

The cast product (e.g., ingot, slab, or strip) can be subjected to further processing steps. Optionally, the further processing steps can be used to prepare products such as sheets, plates, or shates. Such processing steps include, but are not limited to, a homogenization step, a hot rolling step, a cold rolling step that can optionally include an intervening annealing step, and an optional final annealing step. The processing steps are described below in relation to a cast ingot. However, the processing steps can also be used for a cast slab or strip, using modifications as known to those of skill in the art.

Homogenization

As stated above, the processing steps can include a homogenization step. In the homogenization step, an ingot prepared from an alloy composition described herein is heated to attain a peak metal temperature of at least about 475° C. (e.g., at least about 480° C., at least about 485° C., at least about 490° C., at least about 495° C., at least about 500° C., at least about 505° C., at least about 510° C., at least about 515° C., at least about 520° C., at least about 525° C., at least about 530° C., at least about 535° C., at least about 540° C., at least about 545° C., or at least about 550° C.). In some examples, the ingot is heated to a temperature ranging from about 480° C. to about 550° C. (e.g., from about 490° C. to about 540° C. or from about 500° C. to about 550° C.). The heating rate to the peak metal temperature can be from about 10° C./minute to about 100° C./minute. For example, the heating rate to the peak metal temperature can be about 10° C./minute, about 20° C./minute, about 30° C./minute, about 40° C./minute, about 50° C./minute, about 60° C./minute, about 70° C./minute, about 80° C./minute, about 90° C./minute, or about 100° C./minute.

The ingot is then allowed to soak (i.e., maintained at the indicated temperature) for a period of time. In some cases, the ingot is allowed to soak for at least 30 minutes at a peak metal temperature as described above. For example, the ingot can be soaked for at least 30 minutes, at least 1 hour, at least 2 hours, at least 3 hours, at least 4 hours, or at least 5 hours.

Hot Rolling and Coiling

Following the homogenization step, a hot rolling step can be performed. The hot rolling step can be performed using a single stand mill or a multi-stand mill, such as a hot reversing mill operation or a hot tandem mill operation. In certain cases, the ingots are laid down and hot rolled with an entry temperature ranging from about 450° C. to about 550° C. The entry temperature can be, for example, about 450° C., about 460° C., about 470° C., about 480° C., about 490° C., about 500° C., about 510° C., about 520° C., about 530° C., about 540° C., or about 550° C. In certain cases, the hot roll exit temperature can range from about 250° C. to about 350° C. The exit temperature can be, for example, about 250° C., about 260° C., about 270° C., about 280° C., about 290° C., about 300° C., about 310° C., about 320° C., about 330° C., about 340° C., or about 350° C. The ingots can then be hot rolled to a 12 mm thick gauge or less. For example, the ingots can be hot rolled to a 11 mm thick gauge or less, 10 mm thick gauge or less, 9 mm thick gauge or less, 8 mm thick gauge or less, 7 mm thick gauge or less, 6 mm thick gauge or less, 5 mm thick gauge or less, 4 mm thick gauge or less, 3 mm thick gauge or less, 2 mm thick gauge or less, or 1 mm thick gauge or less.

At the end of the hot rolling step, optionally within the single stand mill or a multi-stand mill, the sheet can be rolled up as a coil. The coiling temperature can range from about 285° C. to about 350° C. (e.g., from about 300° C. to about 350° C. or from about 310° C. to about 330° C.).

Cold Rolling and Annealing

The hot rolled coil, plate, shate, or sheet can then undergo a cold rolling step to form a cold rolled coil, sheet, or shate. The cold rolling step can be performed by using a single stand mill or a multi-stand mill. In some cases, the cold rolling step is a one-stage cold rolling process. In some cases, the cold rolling step is a two-stage cold rolling process.

In the one-stage cold rolling process, the coil or sheet temperature can be reduced to a temperature ranging from about 20° C. to about 150° C. (e.g., from about 25° C. to about 140° C. or from about 40° C. to about 120° C.). In some cases, the coil or sheet is cold rolled with an entry temperature ranging from about 20° C. to about 150° C. (e.g., from about 25° C. to about 140° C. or from about 40° C. to about 120° C.). The entry temperature can be, for example, about 20° C., about 30° C., about 40° C., about 50° C., about 60° C., about 70° C., about 80° C., about 90° C., about 100° C., about 110° C., about 120° C., about 130° C., about 140° C., or about 150° C. In some cases, the cold roll exit temperature can range from about 80° C. to about 200° C. (e.g., from about 100° C. to about 190° C. or from about 110° C. to about 180° C.). The exit temperature can be, for example, about 80° C., about 90° C., about 100° C., about 110° C., about 120° C., about 130° C., about 140° C., about 150° C., about 160° C., about 170° C., about 180° C., about 190° C., or about 200° C.

The cold rolling step can be performed at an appropriate temperature for cold rolling as described above for a period of time to result in a gauge of from about 0.2 mm to about 5 mm. For example, the resulting gauge can be from about 0.5 mm to about 4 mm, from about 0.8 mm to about 3.5 mm, from about 1 mm to about 3 mm, or from about 1.45 mm to about 2 mm. Optionally, the cold rolling step can be performed for a period of up to about 1 hour (e.g., from about 10 minutes to about 30 minutes). For example, the cold rolling step can be performed for a period of about 10 minutes, about 20 minutes, about 30 minutes, about 40 minutes, about 50 minutes, or about 1 hour.

As discussed above, the cold rolling step can be a two-stage cold rolling process in which an intervening annealing step is performed during the cold rolling. In the two-stage cold rolling process, the coil or sheet temperature can be reduced to a temperature ranging from about 20° C. to about 150° C. (e.g., from about 25° C. to about 140° C. or from about 40° C. to about 120° C.).

In some cases, the coil or sheet is cold rolled with an entry temperature ranging from about 20° C. to about 150° C. The entry temperature can be, for example, about 20° C., about 30° C., about 40° C., about 50° C., about 60° C., about 70° C., about 80° C., about 90° C., about 100° C., about 110° C., about 120° C., about 130° C., about 140° C., or about 150° C. In some cases, the cold roll exit temperature can range from about 80° C. to about 200° C. The exit temperature can be, for example, about 80° C., about 90° C., about 100° C., about 110° C., about 120° C., about 130° C., about 140° C., about 150° C., about 160° C., about 170° C., about 180° C., about 190° C., or about 200° C.

The first stage of the cold rolling step can be performed at an appropriate temperature for cold rolling as described above for a period of time to result in a gauge of from about 1.2 mm to about 5 mm. For example, the resulting gauge can be from about 1.25 mm to about 4 mm, from about 1.3 mm to about 3.5 mm, from about 1.4 mm to about 3 mm, or from about 1.45 mm to about 2 mm. Optionally, the cold rolling step can be performed for a period of up to about 1 hour (e.g., from about 10 minutes to about 30 minutes). For example, the cold rolling step can be performed for a period of about 10 minutes, about 20 minutes, about 30 minutes, about 40 minutes, about 50 minutes, or about 1 hour.

As the next step of the two-stage cold rolling process, an annealing process referred to herein as an intermediate annealing step can be performed. In the intermediate annealing step, the cold rolled product can be held at a temperature ranging from about 250° C. to about 400° C. (e.g., from about 275° C. to about 375° C. or from about 300° C. to about 350° C.), with a soak time of up to about 4 hours. For example, the soak time can range from about 10 minutes to about 4 hours (e.g., about 10 minutes, about 30 minutes, about 1 hour, about 2 hours, about 3 hours, or about 4 hours). Optionally, the intermediate annealing step can result in an alloy product having grains that are round. In some cases, at least about 50% of the grains present in the alloy product are round (e.g., at least about 60%, at least about 70%, at least about 80%, or at least about 90% of the grains present in the alloy product are round).

Following the intermediate annealing step, a second stage of the cold-rolling process can be performed. In some cases, the second stage of the cold-rolling process includes cold rolling using a single stand mill or a multi-stand mill with an entry temperature ranging from about 20° C. to about 150° C. The entry temperature can be, for example, about 20° C., about 30° C., about 40° C., about 50° C., about 60° C., about 70° C., about 80° C., about 90° C., about 100° C., about 110° C., about 120° C., about 130° C., about 140° C., or about 150° C. In some cases, the cold roll exit temperature can range from about 80° C. to about 200° C. The exit temperature can be, for example, about 80° C., about 90° C., about 100° C., about 110° C., about 120° C., about 130° C., about 140° C., about 150° C., about 160° C., about 170° C., about 180° C., about 190° C., or about 200° C. to result in a gauge of about 2 mm or less (e.g., from about 0.2 mm to about 2 mm or from about 0.2 mm to about 1.4 mm). For example, the resulting gauge can be about 0.2 mm, about 0.3 mm, about 0.4 mm, about 0.5 mm, about 0.6 mm, about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, or about 2 mm.

Optionally, the rolled product can then undergo an annealing process, referred to herein as a stabilization annealing step, at a temperature of from about 100° C. to about 250° C. (e.g., from about 125° C. to about 200° C. or from about 135° C. to about 175° C.) with a soak time of up to about 4 hours. For example, the soak time can range from about 10 minutes to about 4 hours (e.g., about 10 minutes, about 20 minutes, about 30 minutes, about 40 minutes, about 50 minutes, about 1 hour, about 2 hours, about 3 hours, or about 4 hours).

After annealing, the rolled product can optionally undergo one or more additional steps, including tension levelling and/or packaging.

Methods of Using

The products and methods described herein can be used in electronics, transportation (e.g., automotive), architectural, and industrial applications, among others. In some cases, the sheets can be used in an Hxx-temper for applications that require alloys with high formability. In some cases, the sheets can be used to prepare products, such as consumer electronic products or consumer electronic product parts. Exemplary consumer electronic products include mobile phones, audio devices, video devices, cameras, laptop computers, desktop computers, tablet computers, televisions, displays, household appliances, video playback and recording devices, and the like. Exemplary consumer electronic product parts include outer housings (e.g., facades) and inner pieces for the consumer electronic parts. The sheets can be used, for example, as housings for mobile phones and tablet computers and as an electronic inner chassis. In some cases, the sheets can be used to prepare architectural sheet products and architectural sheet product parts. In some examples, the sheets and methods described herein can be used to prepare automobile body parts, such as inner panels. In some cases, the sheets and methods described herein can be used to prepare luggage (e.g., suitcases).

Illustrations of Suitable Products and Methods

As used below, any reference to a series of illustrations is to be understood as a reference to each of those illustrations disjunctively (e.g., "Illustrations 1-4" is to be understood as "Illustrations 1, 2, 3, or 4").

Illustration 1 is an aluminum alloy, comprising 0 to about 0.1 wt. % Si, 0 to about 0.2 wt. % Fe, 0 to about 0.3 wt. % Cu, 0 to about 0.5 wt. % Mn, about 2.0 to about 5.0 wt. % Mg, 0 to about 0.2 wt. % Cr, 0 to about 0.2 wt. % Zn, 0 to about 0.1 wt. % Ti, and up to 0.15 wt. % of impurities, with the remainder as Al.

Illustration 2 is the aluminum alloy of any preceding or subsequent illustration, comprising 0 to about 0.05 wt. % Si, 0 to about 0.1 wt. % Fe, 0 to about 0.1 wt. % Cu, about 0.2 to about 0.5 wt. % Mn, about 2.0 to about 4.5 wt. % Mg, 0 to about 0.1 wt. % Cr, 0 to about 0.1 wt. % Zn, 0 to about 0.05 wt. % Ti, and up to 0.15 wt. % of impurities, with the remainder as Al.

Illustration 3 is the aluminum alloy of any preceding or subsequent illustration, comprising about 0.01 to about 0.05 wt. % Si, about 0.01 to about 0.08 wt. % Fe, about 0.01 to about 0.05 wt. % Cu, about 0.4 to about 0.5 wt. % Mn, about 3.0 to about 4.0 wt. % Mg, about 0.001 to about 0.05 wt. % Cr, about 0.001 to about 0.05 wt. % Zn, about 0.001 to about 0.03 wt. % Ti, and up to 0.15 wt. % of impurities, with the remainder as Al.

Illustration 4 is the aluminum alloy of any preceding or subsequent illustration, wherein the aluminum alloy is produced by direct chill casting.

Illustration 5 is the aluminum alloy of any preceding or subsequent illustration, wherein the aluminum alloy is processed by homogenization, hot rolling, cold rolling, and annealing.

Illustration 6 is a product comprising the aluminum alloy of any preceding or subsequent illustration.

Illustration 7 is the product of any preceding or subsequent illustration, wherein the product is a sheet.

Illustration 8 is the product of any preceding or subsequent illustration, wherein the sheet is an anodized sheet.

Illustration 9 is the product of any preceding or subsequent illustration, wherein one or more surfaces of the anodized sheet comprises a 60° gloss value from 60 to 100.

Illustration 10 is the product of any preceding or subsequent illustration, wherein one or more surfaces of the anodized sheet comprises an L value from 60 to 90, as measured by the Hunter L, a, b color scale.

Illustration 11 is the product of any preceding or subsequent illustration, wherein one or more surfaces of the anodized sheet comprises an a value from −2 to 2, as measured by the Hunter L, a, b color scale.

Illustration 12 is the product of any preceding or subsequent illustration, wherein one or more surfaces of the anodized sheet comprises a b value from −2 to 2, as measured by the Hunter L, a, b color scale.

Illustration 13 is the product of any preceding or subsequent illustration, wherein one or more surfaces of the sheet comprises a surface roughness value from 0.1 μm to 0.35 μm.

Illustration 14 is the product of any preceding or subsequent illustration, wherein one or more surfaces of the anodized sheet comprises a surface roughness value from 0.2 μm to 0.8 μm. Illustration 15 is the product of any preceding or subsequent illustration, wherein one or more surfaces of the anodized sheet includes no more than one defect per square meter (m²) of the product surface, wherein the defect comprises a razor streak defect or a pickup point defect.

Illustration 16 is the product of any preceding or subsequent illustration, wherein the sheet has a yield strength of at least about 200 MPa.

Illustration 17 is the product of any preceding or subsequent illustration, wherein the sheet has a yield strength of from about 200 MPa to about 350 MPa.

Illustration 18 is the product of any preceding or subsequent illustration, wherein the sheet has a tensile elongation of about 7% or greater.

Illustration 19 is the product of any preceding or subsequent illustration, wherein the product comprises a consumer electronic part or a consumer electronic product part.

Illustration 20 is the product of any preceding or subsequent illustration, wherein the product comprises an architectural sheet product or an architectural sheet product part.

Illustration 21 is the product of any preceding or subsequent illustration, wherein the product comprises an automobile body part.

Illustration 22 is a method of producing an aluminum product, comprising: casting an aluminum alloy to form a cast aluminum alloy, wherein the aluminum alloy comprises 0 to about 0.1 wt. % Si, 0 to about 0.2 wt. % Fe, 0 to about 0.3 wt. % Cu, 0 to about 0.5 wt. % Mn, about 2.0 to about 5.0 wt. % Mg, 0 to about 0.2 wt. % Cr, 0 to about 0.2 wt. % Zn, 0 to about 0.1 wt. % Ti, and up to 0.15 wt. % of impurities, with the remainder as Al; scalping the cast aluminum alloy; homogenizing the cast aluminum alloy; hot rolling the cast aluminum alloy to produce a rolled product; and cold rolling the rolled product.

Illustration 23 is the method of any preceding or subsequent illustration, wherein the aluminum alloy comprises 0 to about 0.05 wt. % Si, 0 to about 0.1 wt. % Fe, 0 to about 0.1 wt. % Cu, about 0.2 to about 0.5 wt. % Mn, about 2.0 to about 4.5 wt. % Mg, 0 to about 0.1 wt. % Cr, 0 to about 0.1 wt. % Zn, 0 to about 0.05 wt. % Ti, and up to 0.15 wt. % of impurities, with the remainder as Al.

Illustration 24 is the method of any preceding or subsequent illustration, wherein the aluminum alloy comprises about 0.01 to about 0.05 wt. % Si, about 0.01 to about 0.08 wt. % Fe, about 0.01 to about 0.05 wt. % Cu, about 0.4 to about 0.5 wt. % Mn, about 3.0 to about 4.0 wt. % Mg, about 0.001 to about 0.05 wt. % Cr, about 0.001 to about 0.05 wt. % Zn, about 0.001 to about 0.03 wt. % Ti, and up to 0.15 wt. % of impurities, with the remainder as Al.

Illustration 25 is the method of any preceding or subsequent illustration, further comprising annealing the rolled product after the cold rolling step.

Illustration 26 is the method of any preceding or subsequent illustration, wherein the cold rolling step is a two-stage cold rolling step.

Illustration 27 is the method of any preceding or subsequent illustration, wherein the two-stage cold rolling step comprising a first cold rolling step, an intervening annealing step, and a second cold rolling step.

Illustration 28 is an aluminum alloy product, wherein the aluminum alloy product is prepared by the method of any preceding or subsequent illustration.

The following examples will serve to further illustrate the present invention without, however, constituting any limitation thereof. On the contrary, it is to be clearly understood that resort may be had to various embodiments, modifications, and equivalents thereof which, after reading the description herein, may suggest themselves to those of ordinary skill in the art without departing from the spirit of the invention.

EXAMPLES

Example 1

Figure 1:
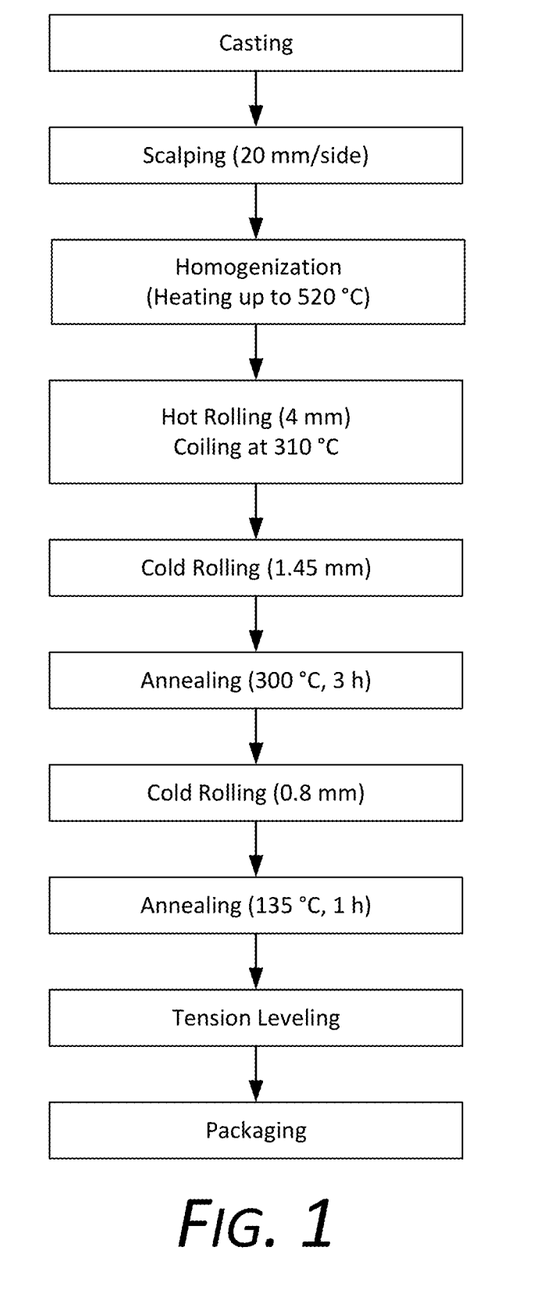
FIG. 1 is a schematic representation of processing conditions for sheets prepared from aluminum alloys as described herein.

An aluminum alloy described herein and a comparative alloy, as shown in Table 4, were prepared according to the methods described herein. Alloy 1 is an exemplary alloy created according to the methods described herein using the steps depicted in FIG. 1. Alloy A is AA5252, which is currently employed as an anodized quality alloy in commercial applications. Alloy A was prepared similarly to Alloy 1 except the final cold rolling was performed to result in an 18% reduction for Alloy A, whereas the reduction for Alloy 1 was a 45% reduction. The cold rolling reduction variations between the two alloys were implemented to prepare comparable samples due to mechanical property differences between the compositions. In each of the alloys, the remainder is aluminum and all values are expressed as wt. %.

TABLE 4

| Alloy | Si | Fe | Cu | Mn | Mg | Cr | Ni | Zn | Ti |
|---|---|---|---|---|---|---|---|---|---|
| Alloy 1 | 0.04 | 0.06 | 0.03 | 0.45 | 3.10 | 0.01 | 0.01 | 0.01 | 0.01 |
| Alloy A | 0.04 | 0.06 | 0.03 | 0.005 | 2.45 | 0.005 | 0.001 | 0.001 | 0.015 |

The mechanical properties of the exemplary and comparative alloys were determined. Specifically, the yield strengths and tensile elongations were determined according to ASTM B557 and the limiting dome heights (which indicates formability) were determined according to ASTM E643. The test results are summarized in Table 5.

TABLE 5

| Parameters | Alloy 1 | Alloy A |
|---|---|---|
| Yield strength (MPa) | 260 | 185 |
| Tensile elongation to fracture (%) | 8.0 | 7.5 |
| Limiting dome height (mm) | 0.280 | 0.271 |

The mechanical properties indicate that exemplary Alloy 1 displays a higher yield strength, a higher tensile elongation, and a higher formability than comparative Alloy A.

Figure 2A:
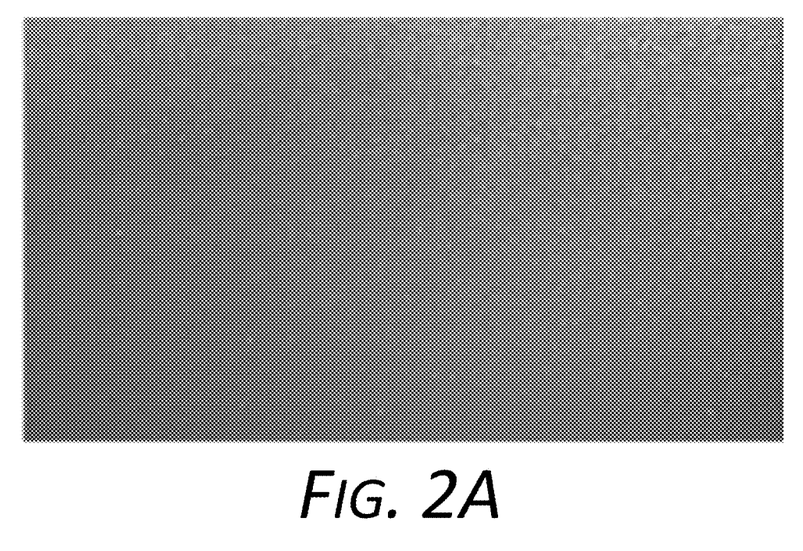
FIG. 2A is a picture of the surface of comparative Alloy A as described herein.
Figure 2B:
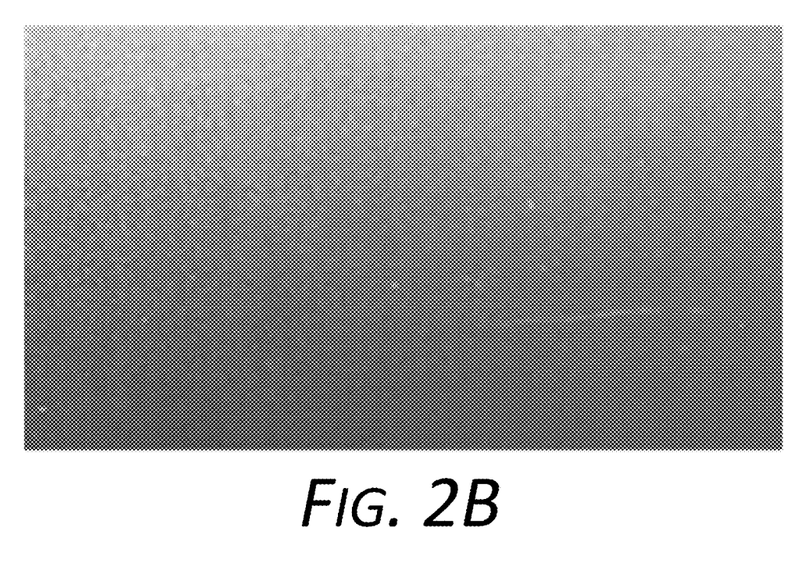
FIG. 2B is a picture of the surface of exemplary Alloy 1 as described herein.
Figure 3:
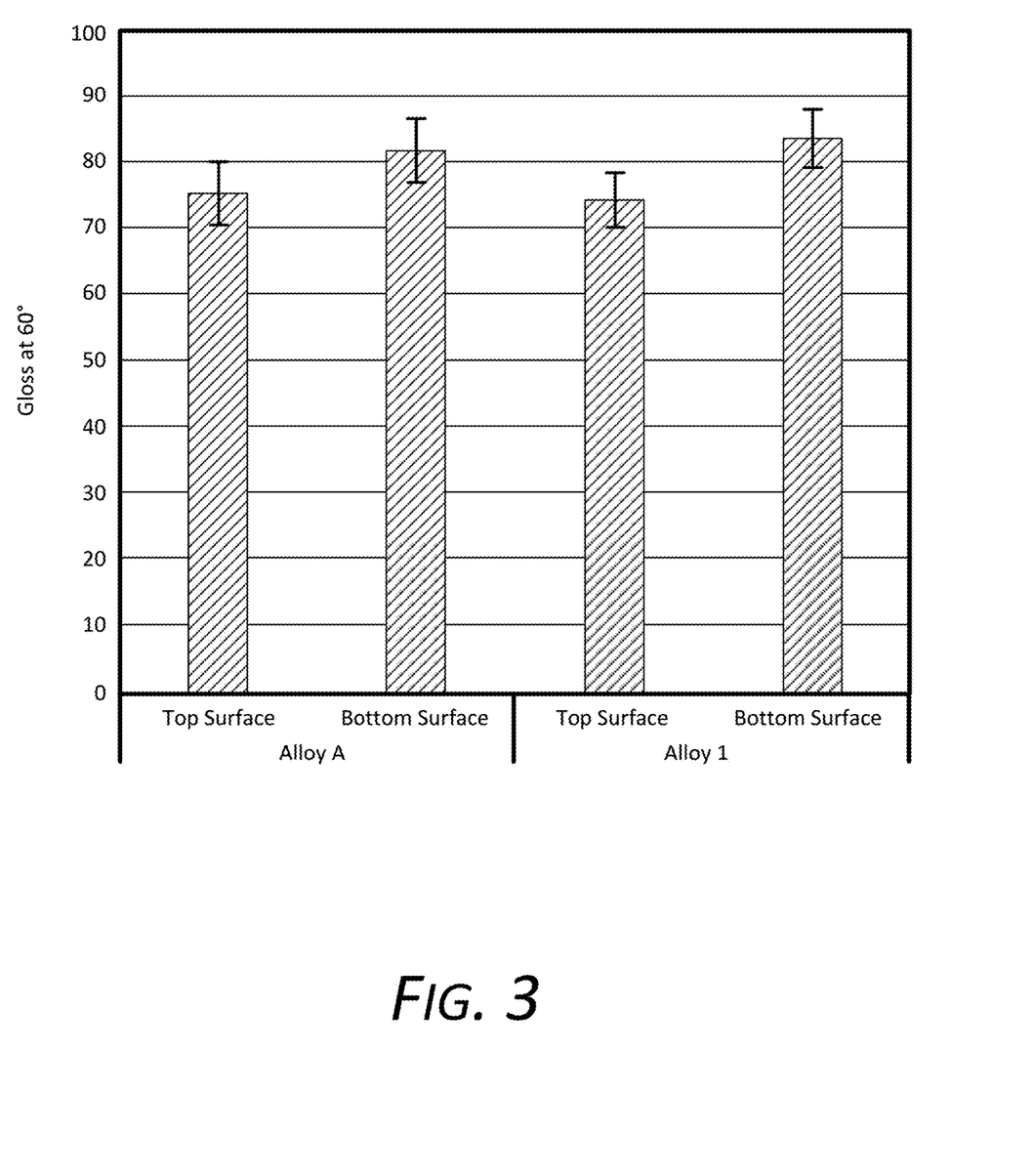
FIG. 3 is a graph showing the gloss units at 60° for the top and bottom surfaces of comparative Alloy A and of Alloy 1.

The appearances of the exemplary and comparative alloys were also compared. As shown in FIGS. 2A and 2B, Alloy 1 (FIG. 2B) displays an anodized quality and linearity (as measured by the streakiness) that is equal to or superior to comparative Alloy A (FIG. 2A). The 60° gloss values were measured for the top surfaces ("top surface") and bottom surfaces ("bottom surface") of the sheets of comparative Alloy A and exemplary Alloy 1. The results demonstrate that Alloy 1 exhibits a degree of gloss that is equal to comparative Alloy A (see FIG. 3).

Example 2

Alloy 1 from Table 4 and reproduced below in Table 6, which contains low amounts of Si and Fe, was prepared as described above in Example 1 and compared to Alloy B, a conventional 5xxx series anodized quality alloy having a higher amount of Si and Fe (Table 6). Alloy B was prepared similarly to Alloy 1 except the final cold rolling was performed to result in an 18% reduction for Alloy B, whereas the reduction for Alloy 1 was a 45% reduction. The cold rolling reduction variations between the two alloys were implemented to prepare comparable samples due to mechanical property differences between the compositions. In each of the alloys, the remainder is aluminum and all values are expressed as wt. %.

TABLE 6

| Alloy | Si | Fe | Cu | Mn | Mg | Cr | Ni | Zn | Ti |
|---|---|---|---|---|---|---|---|---|---|
| Alloy 1 | 0.04 | 0.06 | 0.03 | 0.45 | 3.10 | 0.01 | 0.01 | 0.01 | 0.01 |
| Alloy B | 0.10 | 0.15 | 0.03 | 0.06 | 2.3 | 0.01 | 0.01 | 0.1 | 0.01 |

Figure 4A:
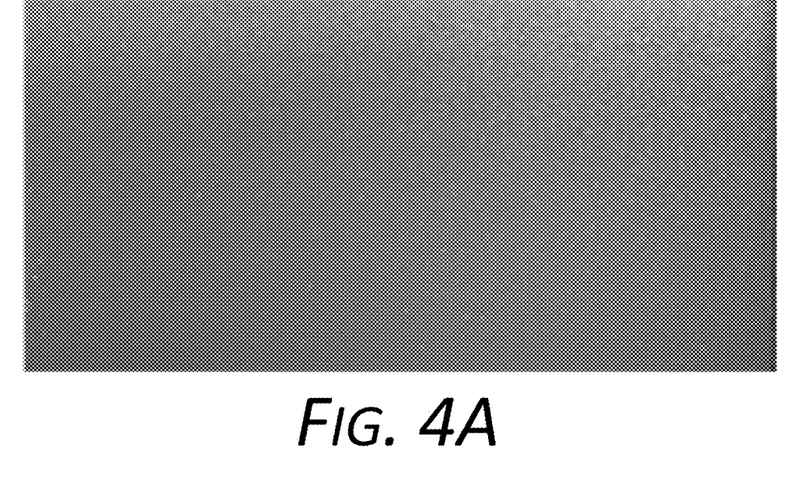
FIG. 4A is a picture of the surface of exemplary Alloy 1 as described herein.
Figure 4B:
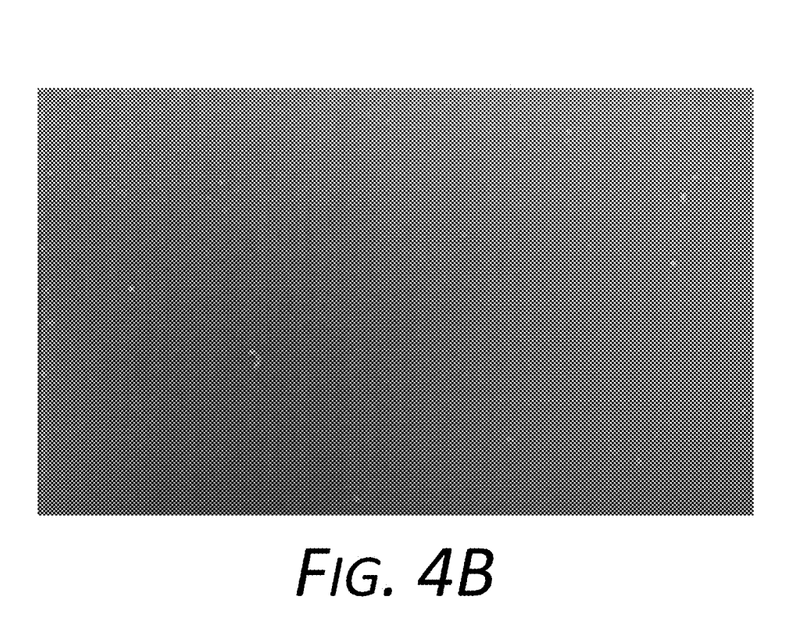
FIG. 4B is a picture of the surface of comparative Alloy B as described herein.
Figure 5:
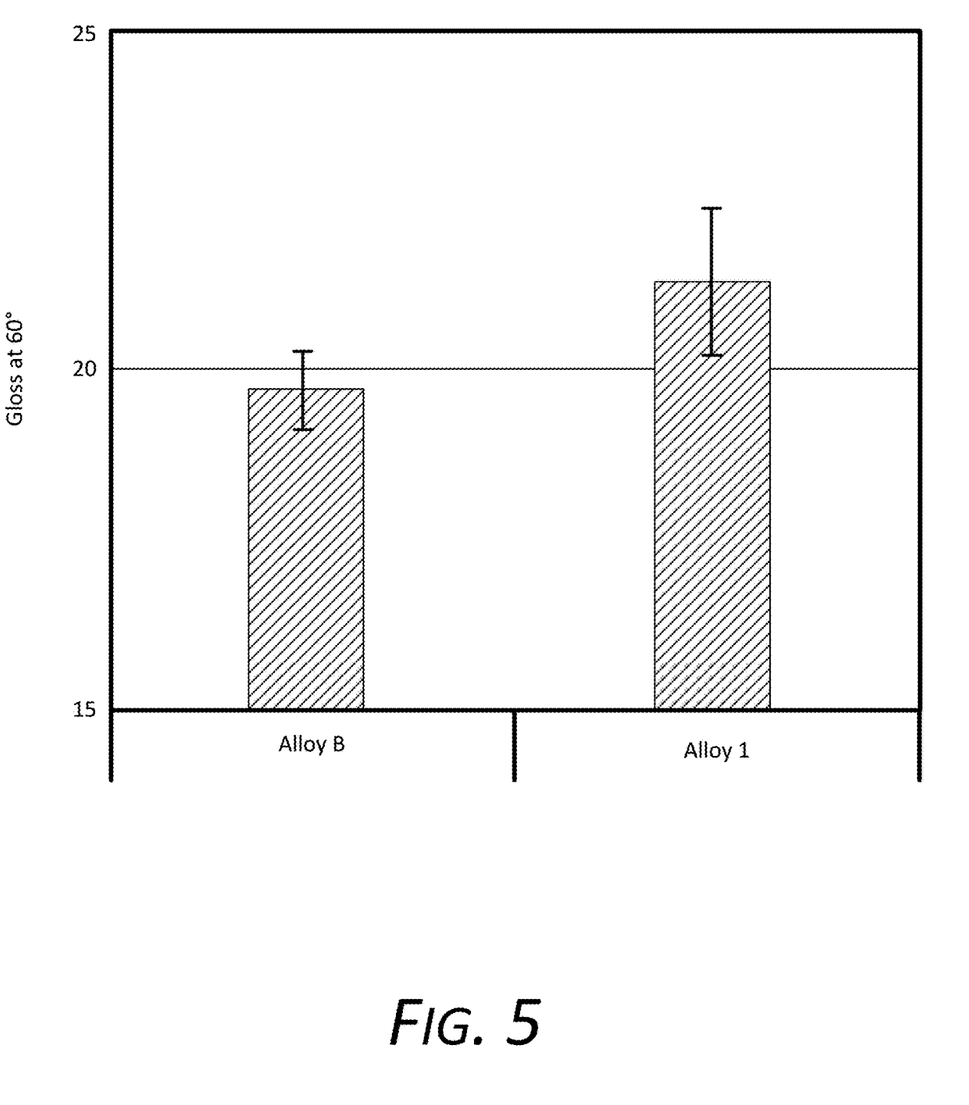
FIG. 5 is a graph showing the gloss units at 60° for a surface of comparative Alloy B and exemplary Alloy 1 as described herein.

A photograph of the surface of Alloy 1 is shown in FIG. 4A and a photograph of the surface of Alloy B is shown in FIG. 4B. Alloy 1 displayed outstanding uniformity and gloss. The gloss measurement was quantitated into 60° gloss values. See FIG. 5. The results demonstrate that Alloy 1 displays higher gloss than Alloy B.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. An aluminum alloy, comprising 0 to 0.1 wt. % Si, 0 to 0.19 wt. % Fe, 0.01 to 0.3 wt. % Cu, 0.35 to 0.5 wt. % Mn, 2.0 to 3.5 wt. % Mg, 0 to 0.2 wt. % Cr, 0 to 0.2 wt. % Zn, 0 to 0.1 wt. % Ti, and up to 0.15 wt. % of impurities, and Al, wherein the aluminum alloy comprises a yield strength from 200 MPa to 350 MPa in an Hxx temper, and wherein the tensile elongation of the aluminum alloy is greater than 7.5%.

2. The aluminum alloy of claim 1, comprising 0 to 0.05 wt. % Si, 0 to 0.1 wt. % Fe, 0.01 to 0.1 wt. % Cu, 0.35 to 0.5 wt. % Mn, 2.0 to 3.5 wt. % Mg, 0 to 0.1 wt. % Cr, 0 to 0.1 wt. % Zn, 0 to 0.05 wt. % Ti, and up to 0.15 wt. % of impurities, and Al.

3. The aluminum alloy of claim 2, comprising 0.01 to 0.05 wt. % Si, 0.01 to 0.08 wt. % Fe, 0.01 to 0.05 wt. % Cu, 0.4 to 0.5 wt. % Mn, 3.0 to 3.5 wt. % Mg, 0.001 to 0.05 wt. % Cr, 0.001 to 0.05 wt. % Zn, 0.001 to 0.03 wt. % Ti, and up to 0.15 wt. % of impurities, and Al.

4. A product comprising the aluminum alloy according to claim 1.

5. The product of claim 4, wherein the product is a sheet.

6. The product of claim 5, wherein the sheet is an anodized sheet.

7. The product of claim 6, wherein one or more surfaces of the anodized sheet comprises a 60° gloss value from 60 to 100.

8. The product of claim 6, wherein one or more surfaces of the anodized sheet comprises an l value from 60 to 90, an a value from −2 to 2, and/or a b value from −2 to 2, as measured by Hunter L, a, b color scale.

9. The product of claim 5, wherein one or more surfaces of the sheet comprises a surface roughness value from 0.1 μm to 0.35 μm.

10. The product of claim 6, wherein one or more surfaces of the anodized sheet comprises a surface roughness value from 0.2 μm to 0.8 μm.

11. The product of claim 4, wherein the product comprises a consumer electronic part or a consumer electronic product part.

12. The product of claim 4, wherein the product comprises an architectural sheet product or an architectural sheet product part.

13. The product of claim 4, wherein the product comprises an automobile body part.

14. A method of producing an aluminum product, comprising:
casting an aluminum alloy to form a cast aluminum alloy, wherein the aluminum alloy comprises 0 to 0.1 wt. % Si, 0 to 0.19 wt. % Fe, 0.01 to 0.3 wt. % Cu, 0.35 to 0.5 wt. % Mn, 2.0 to 3.5 wt. % Mg, 0 to 0.2 wt. % Cr, 0 to 0.2 wt. % Zn, 0 to 0.1 wt. % Ti, and up to 0.15 wt. % of impurities, and Al;
scalping the cast aluminum alloy;
homogenizing the cast aluminum alloy;
hot rolling the cast aluminum alloy to produce a rolled product; and
cold rolling the rolled product,
wherein the aluminum alloy comprises a yield strength from 200 MPa to 350 MPa in an Hxx temper; and
wherein the tensile elongation of the aluminum alloy is greater than 7.5%.

15. The method of claim 14, further comprising annealing the rolled product after the cold rolling step.

16. The method of claim 14, wherein the cold rolling step is a two-stage cold rolling step, wherein the two-stage cold rolling step comprising a first cold rolling step, an intervening annealing step, and a second cold rolling step.

17. An aluminum alloy product, wherein the aluminum alloy product is prepared by the method of claim 14.

* * * * *